Jan. 12, 1937.  H. F. JOHNSON ET AL  2,067,271
COUPLING FOR SUCKER RODS AND THE LIKE
Filed May 9, 1934

INVENTORS
HOWARD F. JOHNSON
JOHN F. CONNELLY
Kwis Hudson & Kent
ATTORNEYS

Patented Jan. 12, 1937

2,067,271

UNITED STATES PATENT OFFICE 2,067,271

COUPLING FOR SUCKER RODS AND THE LIKE

Howard F. Johnson, Cleveland, and John F. Connelly, Cleveland Heights, Ohio, assignors to The Drillers Supply & Manufacturing Company, Cleveland, Ohio, a corporation of Ohio Application May 9, 1934, Serial No. 724,748

2 Claims. (Cl. 287—111)

This invention relates to a coupling for rods and the like, and is adapted particularly as a coupling for sucker rods.

The principal object of the present invention is to provide a coupling for the ends of two adjoining members, such as sucker rods, which will have the requisite strength at all cross-sectional points from one end of the coupling to the other and which does not materially or to an objectionable extent increase the overall diameter of the coupled members where the coupling is located. That is to say, it is one of the objects to provide a coupling such that the end portions of the rods or other members can be reduced to accommodate and interfit in locking engagement with the coupling so that the strength and the resistance to breakage of the coupling and the coupled members therein are substantially uniform throughout the length of the coupling, and to accomplish this without the necessity of enlarging the adjacent ends of the rods by upsetting or otherwise and without requiring a coupling of objectionably large diameter.

It is a well known fact that sucker rods are required to sustain very heavy loads, especially when used in deep wells. This makes it essential that at the couplings the assembled or connected sucker rods have, for safety reasons, the strength of the rods at any point between the couplings. It is also well known that, when the couplings are of large diameter, they decrease the pumping efficiency, increase the wear on the couplings and casing employed in the well, and are otherwise objectionable. The coupling forming the subject matter of this invention answers the requirements of strength and reliability against breakage, durability, ease of assembly, and low cost.

The invention may be briefly summarized as consisting in certain novel combinations and arrangements of parts which will be described in the specification and set forth in the appended claims.

In the accompanying sheet of drawings showing the preferred embodiment of the invention—

Figure 1:
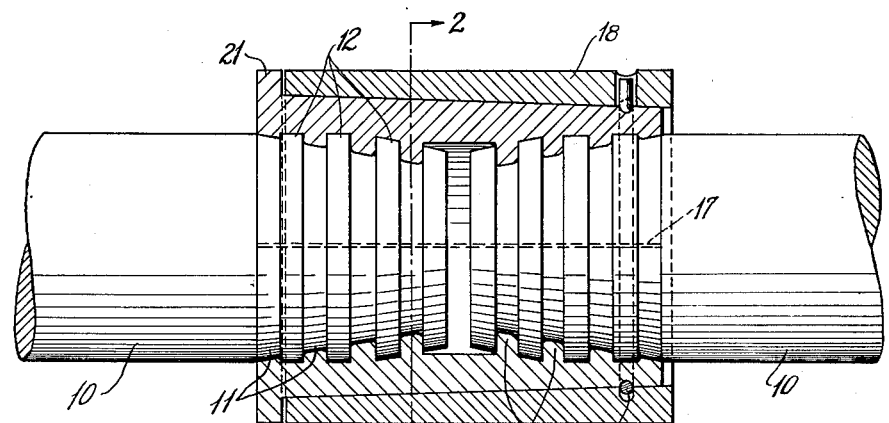
Fig. 1 is a view partly in section and partly in elevation showing the coupled ends of two sucker rods with the coupling itself in section and showing how the ends of the rods are shaped to accommodate the coupling.

Referring now to the drawing, 10 represents two members, such as sucker rods, which are coupled together forming a coupling or coupled joint embodying the invention. It is to be noted that at and inside the coupling itself the rods 10 are of no greater diameter than at any point between the couplings. That is to say, the rods do not have to be enlarged at their ends for coupling purposes but rather are reduced, but the reduction is made in such a way as not to provide a weakened point anywhere between the ends of the coupling. It is to be noted that the rods 10 have a series of annular, axially spaced grooves 11 which are progressively deeper, the bases of the grooves being preferably inclined and on a taper which extends from the outer part of the outermost groove, which is at the surface of the rod, toward the inner end of the rod. Between the grooves are annular flange-like rings which are preferably square shouldered rings. In this instance, the two outermost rings have annular outer surfaces the diameter of which is the diameter of the rod, but the remaining rings, here two in number, are progressively of less diameter and their outer surfaces are in this instance tapered in conformity with the taper of the base of the grooves. The innermost ring 12 is at the inner end of the rod. It will be understood, of course, that the number of rings and the number of grooves formed in each end of the rod may be varied.

The coupling proper includes a sleeve 13 which is preferably formed in two halves and is designed and shaped internally to conform to the grooved ends of the two rods. Internally of the sleeve and centrally thereof is a square shouldered annular groove 14 which is of sufficient depth and width to receive the rings 12 at the inner ends of the two rods with the rods spaced a slight distance apart, as shown in Fig. 1. On both sides of the groove 14 are alternate annular internal grooves 15 and annular rings or flanges 16 which interfit with the alternate grooves 11 and flanges or rings 12 formed on the ends of the rods, the inner surfaces of the rings or flanges 16 conforming to and engaging the bases of the grooves 11 and the bases of the grooves 15 conforming to and engaging the outer surfaces of the rings or flanges 12 of the rods.

Figure 2:
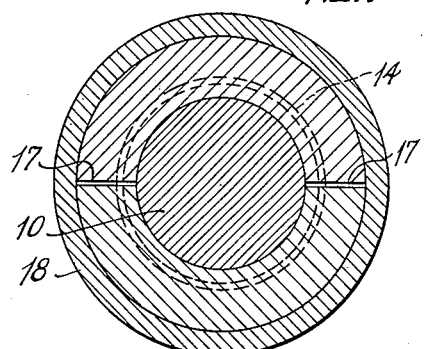
Fig. 2 is a transverse sectional view substantially along the line 2—2 of Fig. 1.

As the grooves formed on the ends of the rods are progressively deeper or, otherwise stated, are on a taper and therefore progressively a greater distance from the normal outer surface of the rods, so the inner surfaces of the internal ribs or flanges are on a taper and therefore form portions of a tapered or conical surface which is progressively larger from the annular groove 14 outwardly to the end of the two-part sleeve 13. The outer surface of the two-part sleeve 13 is preferably on a taper, and when the two parts are fitted around the grooved and flanged ends of the rods, the contiguous edges of the two halves are close together but slightly out of contact, as shown in Fig. 2 at 17, and they preferably remain out of contact when the parts of the coupling are fully assembled.

The remaining part of the coupling consists of a continuous or one-piece sleeve 18 which has an internal taper conforming to the taper of the outer surface of the two-part sleeve 13 and which is forced onto the latter to hold the same in tightly fitting interlocking engagement with the ends of the rods. The outer surface of the sleeve 18 may or may not be tapered, but it is preferably straight so as to provide a deeper wearing surface.

Any suitable means may be provided to lock the tapered outer sleeve 18 to the outer surface of the two-part sleeve 13, as, for example, a spring locking ring 19 which, when the sleeve 18 is forced tightly and its full distance onto the two-part sleeve, contracts or springs inwardly so as to lie partly in an annular groove 20 formed adjacent one end of the two-part sleeve 13 and partly in an annular groove formed on the inner surface of the sleeve 18. The larger end of the two-part sleeve may be flanged as shown at 21.

Figures 5, 6:
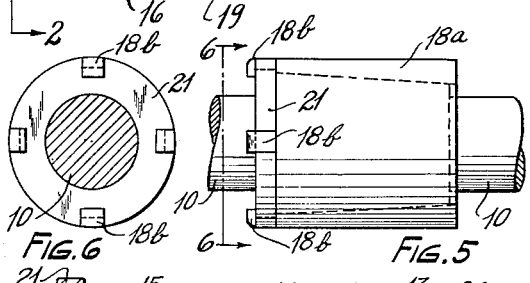
Fig. 5 is a view in elevation showing a slight modification in the coupling.
Fig. 6 is a sectional view substantially along the line 6—6 of Fig. 5, looking in the direction indicated by the arrows.
Figure 4:
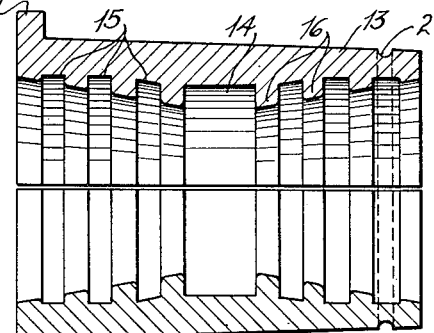
Fig. 4 shows a two-part coupling sleeve which is adapted to interlockingly engage the reduced ends of the rods, the rods themselves not being here shown.
Figure 3:
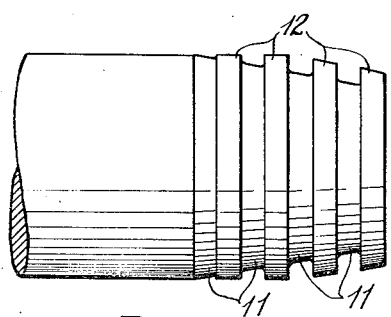
Fig. 3 shows the end portion of one of the rods removed from the coupling.

In Figs. 5 and 6 we have shown a different method of locking the outer continuous or one-piece sleeve onto the inner two-part sleeve. The coupling here shown is identical with that previously described except that the outer sleeve, here designated 18ª, is provided at one end with a series of lugs 18ᵇ which, when the sleeve is forced onto the outer tapered surface of the inner sleeve, enter notches formed on the flange 21 at the end of the inner sleeve. The ends of the lugs are then bent over the outer side of the flange so as to lock the sleeve 18ª in place.

The two-part sleeve 13 is preferably formed of steel which may be heat-treated if necessary. The outer sleeve 18 or 18ª may be formed of aluminum bronze or other hard wear-resisting material. The wear on the outer sleeve, by its engagement with the casing of the well, is not excessive, but, when wear occurs, the worn sleeve may be replaced with a new sleeve, it being a feature of this coupling that assembly and disassembly are easily effected. With this coupling or joint, the interfitting ribs on the rod ends and the sleeve 13 are in no danger of stripping under the load supported by the rods when in use in pumping. Furthermore, breakage is not at all likely to occur at the coupling. While, as previously stated, the coupling and joint are designed so as to avoid the danger of breakage from one end of the coupling to the other, any tendency for the joint to break would perhaps be greatest at the middle of the coupling or at the end of the coupling where the first groove in the rod is located. However, there is sufficient cross-sectional area at the middle of the coupling to avoid breakage at this point, and, since the grooving of the end of the rod is progressive and the first groove cuts only very slightly into the rod, the rod itself is weakened at this point only slightly, but the weakening of the rod at this point can, if necessary, be entirely overcome by heat-treating the ends of the rods, in which event the rod at the coupling would actually be stronger than at points between the couplings.

In sucker rod couplings wherein the ends of the rods are threaded and are screwed into the threaded ends of a coupling, the whole length of the rod is a continuous more or less solid member, with the result that the line of rods has a tendency to whip when the well is being pumped, resulting in wear on the casing and on the rods and couplings. Although the two-part sleeve is perfectly tightly fitted onto the groove and flanged ends of both rods, the construction is such that if it is desired to eliminate whip from the rods, the grooves and flanges at one end of the sleeve can be cut deeper than at the other end so that the sleeve will fit tightly on the end of one rod and relatively loosely on the end of the other rod so that the latter can turn in the coupling. With this arrangement used at the joints between the series of rods extending down into the well, the relative turning of the couplings will equalize the wear or make it substantially uniform all around the coupling.

It will be seen that we have provided a coupling which answers the requirements and accomplishes the objects stated at the beginning of the specification.

While we have shown only the preferred construction and a modification involving a detail of the outer sleeve, we aim in our claims to cover all modifications which do not depart from the spirit and scope of the invention.

Having thus described our invention, we claim:

1. The combination of two members to be coupled and a coupling therefor, the adjacent ends of the members being provided with alternately arranged annular grooves and flanges, the flanges adjacent the ends of the members being of less diameter than the members while the remaining flanges are substantially of the same diameter as the members, the grooves being progressively deeper and the bases of the grooves being on a taper extending from near the outer end of the coupling inwardly toward the inner ends of the members and the coupling comprising a sleeve-like member fitted onto the grooved and flanged ends of the members to be coupled and provided on the interior with alternately arranged flanges and grooves, the inner surfaces of the flanges on the sleeve-like member forming tapered surfaces conforming to the taper of the bases of the grooves of the members to be connected.

2. The combination of two members to be coupled and a coupling therefor, the adjacent ends of the two members being provided with alternately arranged annular grooves and flanges, the flanges adjacent the ends of the members being of less diameter than the members while the remaining flanges are substantially of the same diameter as the members, the grooves being progressively deeper and the bases of the grooves being on a taper extending from near the outer end of the coupling toward the inner ends of the members, the flanges adjacent the ends of the members having their peripheries tapered substantially parallel to the taper of the grooves and the coupling comprising a sleeve-like member fitted onto the grooved and flanged ends of the members to be coupled and provided on the interior with alternately arranged flanges and grooves, the inner surfaces of the flanges on the sleeve-like member forming tapered surfaces conforming to the taper of the bases of the grooves of the members to be connected and certain of the grooves of the sleeve-like member being formed on a taper substantially parallel to the taper of the grooves of the two members to be connected.

HOWARD F. JOHNSON.
JOHN F. CONNELLY.